(12) United States Patent
Yoshii et al.

(10) Patent No.: US 10,458,480 B2
(45) Date of Patent: Oct. 29, 2019

(54) CONSTANT VELOCITY JOINT AND METHOD OF MANUFACTURING THE SAME

(71) Applicant: JTEKT Corporation, Osaka-shi (JP)

(72) Inventors: Tatsuya Yoshii, Kashihara (JP); Yoshinari Sakai, Takahama (JP); Yoshimi Aoki, Handa (JP); Tomohiro Nishida, Kariya (JP); Tomo Shigeno, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 249 days.

(21) Appl. No.: 15/613,314

(22) Filed: Jun. 5, 2017

(65) Prior Publication Data

US 2017/0350455 A1 Dec. 7, 2017

(30) Foreign Application Priority Data

Jun. 6, 2016 (JP) ................................ 2016-112685

(51) Int. Cl.
| | |
|---|---|
| *F16D 3/224* | (2011.01) |
| *F16D 3/2245* | (2011.01) |
| *B21K 1/76* | (2006.01) |
| *B24B 19/06* | (2006.01) |
| *F16D 3/223* | (2011.01) |

(52) U.S. Cl.
CPC ............ *F16D 3/2245* (2013.01); *B21K 1/765* (2013.01); *B24B 19/06* (2013.01); *F16D 2003/22309* (2013.01); *Y10S 29/019* (2013.01); *Y10S 464/906* (2013.01)

(58) Field of Classification Search
CPC ......... F16D 3/2245; F16D 2003/22309; B21K 1/765; Y10S 464/906; Y10S 29/019; B24B 19/06
USPC ............................................. 464/145; 451/52
See application file for complete search history.

(56) References Cited

U.S. PATENT DOCUMENTS

| | | | | |
|---|---|---|---|---|
| 1,224,680 | A | * 5/1917 | Starin | ..................... B24B 19/06 451/52 |
| 9,163,672 | B2 | * 10/2015 | Yamazaki | ............. F16D 3/2233 |

FOREIGN PATENT DOCUMENTS

| | | | |
|---|---|---|---|
| JP | 54-125343 A | * 9/1979 | .................... 464/145 |
| JP | 2010-185538 | 8/2010 | |

* cited by examiner

*Primary Examiner* — Greg Binda
(74) *Attorney, Agent, or Firm* — Oblon, McClelland, Maier & Neustadt, L.L.P.

(57) ABSTRACT

Outer ball grooves of an outer joint member of a constant velocity joint each have a first ball groove for allowing a ball to roll therein when the constant velocity joint operates, and a second ball groove having a ball groove radius larger than a ball groove radius of the first ball groove. The second ball groove has a curved line and a connecting line. The curved line is connected to a groove bottom end of the first ball groove located closer to an opening of the outer joint member and is curved radially outward in a concave manner. The connecting line connects the curved line and the opening. The curved line is curved with a curvature center that is located closer to the opening than the groove bottom end of the first ball groove and that is located radially inside the outer joint member.

7 Claims, 7 Drawing Sheets

CONSTANT VELOCITY JOINT AND METHOD OF MANUFACTURING THE SAME

INCORPORATION BY REFERENCE

The disclosure of Japanese Patent Application No. 2016-112685 filed on Jun. 6, 2016 including the specification, drawings and abstract, is incorporated herein by reference in its entirety.

BACKGROUND OF THE INVENTION

1. Field of the Invention

The invention relates to a constant velocity joint and a method of manufacturing the constant velocity joint.

2. Description of Related Art

Japanese Patent Application Publication No. 2010-185538 (JP 2010-185538 A) discloses a constant velocity joint that includes: a bottomed cylindrical outer joint member having an opening at one side in the direction of the rotation axis and having an inner circumferential surface provided with outer ball grooves; an inner joint member having an outer circumferential surface provided with inner ball grooves; balls that roll in the outer ball grooves and the inner ball grooves; and a cage for retaining the balls.

The outer ball grooves of the constant velocity joint each have a machined region and an unmachined region. The machined region is subjected to grinding and is located in the middle of the outer joint member in the direction of the rotation axis. The unmachined region is not subjected to grinding and is located on each side of the machined region in the direction of the rotation axis. The presence of the unmachined region reduces the area of the outer ball groove subjected to grinding, thus reducing the cost of manufacturing the constant velocity joint.

The groove bottom in the unmachined region disclosed in JP 2010-185538 A has a convex circular arc shape with a center of curvature at a point that is located radially outside the outer joint member (i.e., at the point P3 in JP 2010-185538 A). Thus, the unmachined region expands in a radially inward direction of the outer joint member to form a convexly curved surface. Due to this shape, in actual grinding, a grinding wheel or a toothed portion may touch part of the unmachined region and unnecessarily grind the part outside a rolling area that is used when the constant velocity joint operates. The time spent to grind the part of the unmachined region may elongate machining lead time.

SUMMARY OF THE INVENTION

A purpose of the invention is to provide a constant velocity joint and a method of manufacturing the constant velocity joint that allows a reduction in machining lead time.

An aspect of the invention provides a constant velocity joint including: a bottomed cylindrical outer joint member having an opening at one side in an axial direction and having a concave spherical inner circumferential surface provided with multiple outer ball grooves; an inner joint member located inside the outer joint member and having a convex spherical outer circumferential surface provided with multiple inner ball grooves; multiple balls that roll in the outer ball grooves and the inner ball grooves; and a cage located between the inner circumferential surface of the outer joint member and the outer circumferential surface of the inner joint member to accommodate the balls.

Each of the outer ball grooves of the outer joint member includes: a first ball groove and a second ball groove. The first ball groove allows a corresponding one of the balls to roll therein when the constant velocity joint operates. The second ball groove is located closer to the opening than the first ball groove and has a ball groove radius larger than a ball groove radius of the first ball groove. The second ball groove has a curved line and a connecting line in an axial cross section passing through the bottom of a corresponding one of the outer ball grooves. The curved line is connected to a groove bottom end of the first ball groove and is curved radially outward in a concave manner. The groove bottom end is an end of the bottom of the first ball groove that is located closer to the opening than to the bottom of the outer joint member. The connecting line connects the curved line and the opening. The curved line is curved with a center of curvature that is located closer to the opening than the groove bottom end of the first ball groove and that is located radially inside the outer joint member.

The first ball groove is used when the constant velocity joint operates. Therefore, the first ball groove is subjected to grinding. The second ball groove is located closer to the opening than the first ball groove and is used when the constant velocity joint is assembled, not when the constant velocity joint operates. Therefore, the second ball groove does not need grinding. The ball groove radius of the second ball groove is larger than the ball groove radius of the first ball groove. The "ball groove radius" refers to a radius of an imaginary inscribed circle of a ball groove. This shape of the second ball groove makes it difficult for a grinding tool, such as a grinding wheel, to touch the second ball groove when grinding the first ball groove.

Further, the bottom of the second ball groove has the curved line and the connecting line. The curved line is curved with the center of curvature that is located closer to the opening than the groove bottom end as a junction with the first ball groove and that is located radially inside the outer joint member. Specifically, the curved line is curved in a concave manner from the groove bottom end in the radially outward direction of the outer joint member.

This feature makes it possible to grind the first ball groove without a grinding tool, such a grinding wheel, touching an area of the second ball groove where the curved line is located. Since the second ball groove is not grinded when grinding the first ball groove, machining lead time is reduced accordingly. This also reduces the area of the outer ball groove subjected to grinding, thus reducing the amount of machining. Accordingly, a member, such as a grinding wheel, used in grinding is less likely to wear out. Thus, the constant velocity joint according to this aspect allows a reduction in manufacturing cost.

Another aspect of the invention provides a method of manufacturing the constant velocity joint described above. The method includes: forming the first ball groove by grinding; and forming the second ball groove by plastic working. This method has the same effects as the constant velocity joint described above.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
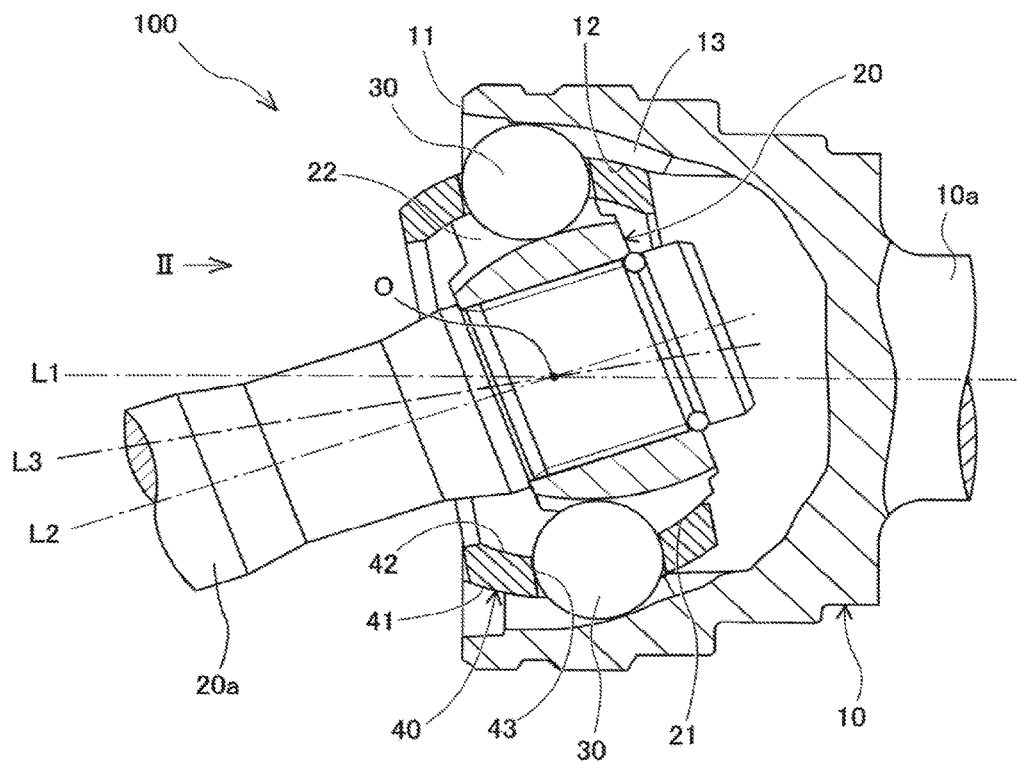
FIG. 1 is a cross-sectional view of a constant velocity joint according to a first embodiment of the invention, taken along the direction of the rotation axis of the constant velocity joint.

A constant velocity joint 100 according to a first embodiment of the invention is described with reference to FIG. 1. The constant velocity joint 100 is a joint center fixed ball-type constant velocity joint and is preferably used as, for example, an outboard joint for front drive shafts of vehicles. As illustrated in FIG. 1, the constant velocity joint 100 includes an outer joint member 10, an inner joint member 20, six balls 30, and a cage 40.

The outer joint member 10 has a bottomed cylindrical shape with an opening 11 at one side (left side of FIG. 1) in the direction of a rotation axis L1. The outer joint member 10 has a concave spherical inner circumferential surface 12 and six outer ball grooves 13 on the inner circumferential surface 12. In the description below, the left side of FIG. 1 is referred to as the opening side, and the right side of FIG. 1 is referred to as the bottom side.

The inner circumferential surface 12 of the outer joint member 10 is shaped to follow a sphere with a center at an intersection point O between the rotation axis L1 of the outer joint member 10 and a rotation axis L2 of the inner joint member 20. Each of the six outer ball grooves 13 extends in the direction of the rotation axis L1. The outer ball grooves 13 are arranged at even circumferential intervals (60 degree intervals in the present embodiment) around the rotation axis L1.

Although not illustrated in the drawings, junctions of the inner circumferential surface 12 of the outer joint member 10 with the outer ball grooves 13 are chamfered. The bottom of the outer joint member 10 is integrally provided with a coupling shaft 10a extending in the direction of the rotation axis L1. The coupling shaft 10a is coupled to another power transfer shaft that is not illustrated in the drawings.

The inner joint member 20 has an annular shape. The inner joint member 20 has a convex spherical outer circumferential surface 21 and six inner ball grooves 22 on the outer circumferential surface 21 of the inner joint member 20.

The outer circumferential surface 21 of the inner joint member 20 is shaped to follow a sphere with a center at the intersection point O. Each of the six inner ball grooves 22 extends in the direction of the rotation axis L2. The inner ball grooves 22 are arranged at even circumferential intervals around the rotation axis L2. Although not illustrated in the drawings, junctions of the outer circumferential surface 21 of the inner joint member 20 with the inner ball grooves 22 are chamfered. An inner circumferential surface of the inner joint member 20 is provided with an internal spline (not illustrated in the drawings) that intermeshes with an external spline (not illustrated in the drawings) on the shaft 20a.

The cage 40 is an annular member and is located between the inner circumferential surface 12 of the outer joint member 10 and the outer circumferential surface 21 of the inner joint member 20. The cage 40 has a convex spherical outer circumferential surface 41, a concave spherical inner circumferential surface 42, and six windows 43. The outer circumferential surface 41 of the cage 40 is shaped to follow the inner circumferential surface 12 of the outer joint member 10. The inner circumferential surface 42 of the cage 40 is shaped to follow the outer circumferential surface 21 of the inner joint member 20. The windows 43 are each a rectangular hole that radially penetrates the cage 40. The six windows 43 are arranged at even circumferential intervals around a rotation axis L3 of the cage 40. Each of the windows 43 accommodates one of the balls 30.

The outer circumferential surface 41 of the cage 40 is at least partially in contact with the inner circumferential surface 12 of the outer joint member 10. The inner circumferential surface 42 of the cage 40 is at least partially in contact with the outer circumferential surface 21 of the inner joint member 20. Each of the balls 30 is located between one of the outer ball grooves 13 and one of the inner ball grooves 22 that face each other. The cage 40 retains the balls 30 to allow the balls 30 to roll in the outer ball grooves 13 and the inner ball grooves 22.

For example, in an axial cross section along the rotation axis L1, a rolling contact surface of the outer ball groove 13 where the ball 30 rolls has a circular arc shape with a center at a point that is located closer to the opening 11 than the intersection point O between the rotation axis L1 and the rotation axis L2. A rolling contact surface of the inner ball groove 22 where the ball 30 rolls has a circular arc shape with a center at a point that is located closer to the bottom of the outer joint member 10 than the intersection point O. The six balls 30 circumferentially engage with the outer ball grooves 13 around the rotation axis L1 and circumferentially engage with the inner ball grooves 22 around the rotation axis L2, thus transferring torque between the outer joint member 10 and the inner joint member 20.

Figure 2:
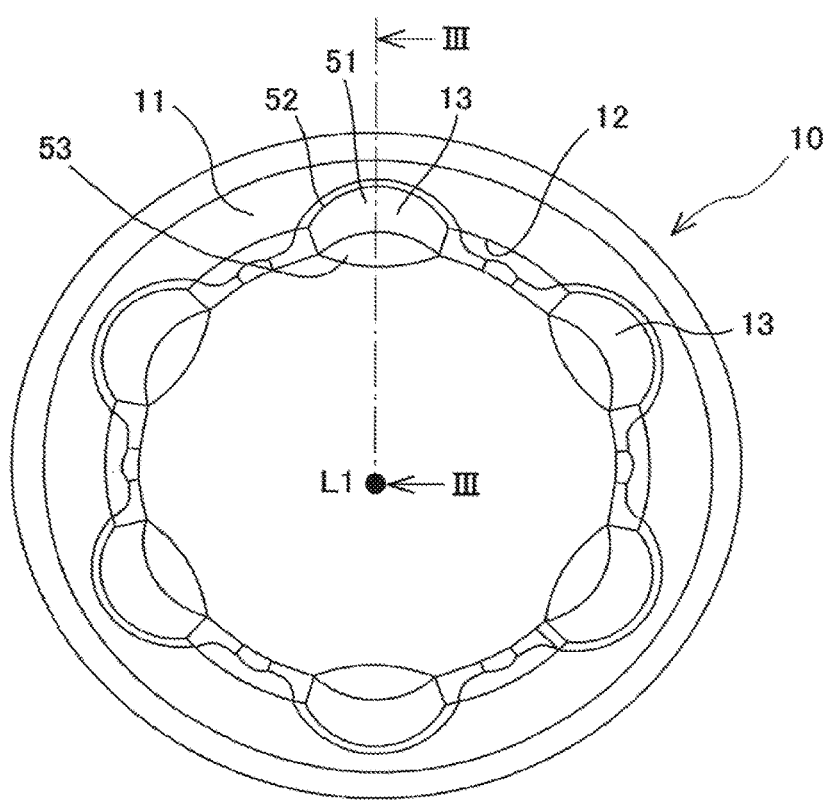
FIG. 2 is a view on arrow II in FIG. 1 and illustrates an outer joint member viewed from an opening of the outer joint member.
Figure 3:
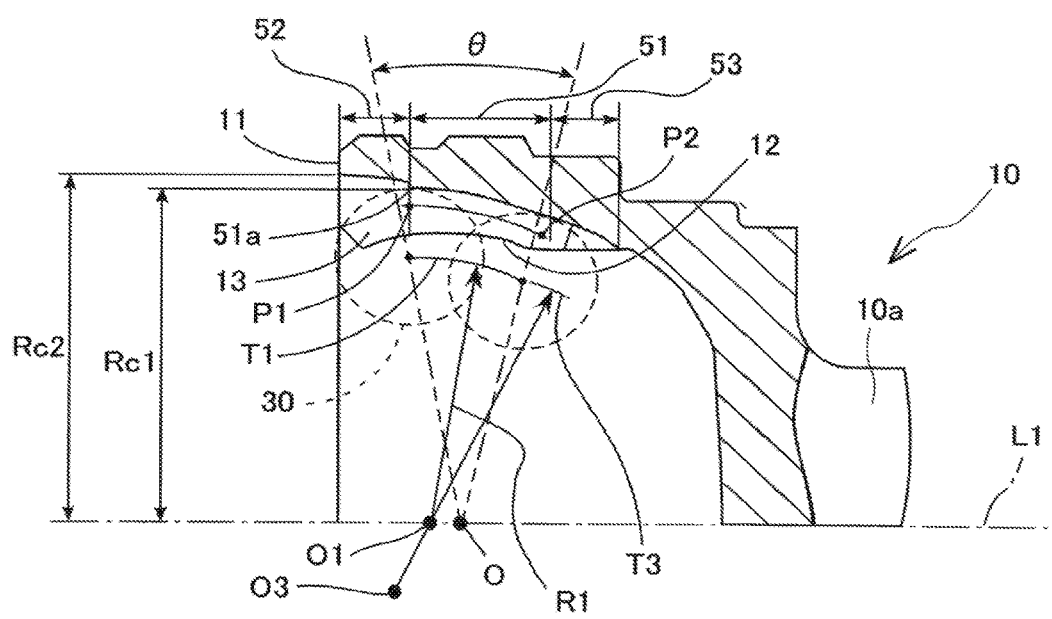
FIG. 3 is an enlarged partial cross-sectional view taken along line III-III in FIG. 2 and illustrates the outer joint member in an axial cross section passing through the bottom of an outer ball groove.

Next, the outer ball grooves 13 on the inner circumferential surface 12 of the outer joint member 10 are described with reference to FIG. 2 and FIG. 3. As illustrated in FIG. 2 and FIG. 3, each of the outer ball grooves 13 has a first ball groove 51, a second ball groove 52, and a third ball groove 53.

The first ball groove 51 is located almost in the middle of the outer ball groove 13 in the direction of the rotation axis L1. The first ball groove 51 has a surface that is subjected to grinding after being subjected to plastic working (including forging and ironing). The first ball groove 51 is shaped such that a locus T1 of the center of the ball 30 rolling in the first ball groove 51 forms a circular arc that has a center of curvature at a point O1 and that has a radius of curvature of R1. The point O1 is offset from the intersection point O toward the opening side.

The first ball groove 51 covers a rolling area where the ball 30 rolls when the constant velocity joint 100 operates. Specifically, for example, as illustrated in FIG. 3, two contact points at which the ball 30 comes in contact with the outer ball groove 13 when a joint operating angle θ reaches a maximum value are defined as contact points P1 and P2. In this case, the axial length of the rolling area for the ball 30 is from the contact point P1 to the contact point P2. An opening-side end of the first ball groove 51 may be located at the same position as the contact point P1 or may be located slightly closer to the opening 11 than the contact point P1. A bottom-side end of the first ball groove 51 may be located at the same position as the contact point P2 or may be located slightly closer to the bottom of the outer joint member 10 than the contact point P2. Thus, the rolling area where the ball 30 rolls when the constant velocity joint 100 operates is inside the first ball groove 51 subjected to grinding.

The second ball groove 52 adjoins to the opening-side end of the first ball groove 51 and extends from the opening-side end of the first ball groove 51 to the opening 11 of the outer joint member 10. The second ball groove 52 is located in an area where the ball 30 does not roll when the constant velocity joint 100 operates. The second ball groove 52 is used when the ball 30 is installed into the outer joint member 10.

The second ball groove 52 is located radially outside a surface that is formed by elongating the opening-side end of the first ball groove 51. As such, the second ball groove 52 is recessed relative to the first ball groove 51. Further, the second ball groove 52 has a surface subjected to plastic working. In other words, the second ball groove 52 is not subjected to grinding.

The third ball groove 53 is located closer to the bottom of the outer joint member 10 than the first ball groove 51 and adjoins to the bottom-side end of the first ball groove 51. Like the second ball groove 52, the third ball groove 53 is located in an area where the ball 30 does not roll when the constant velocity joint 100 operates, and is used when the ball 30 is installed into the outer joint member 10.

The third ball groove 53 is located radially outside a surface that is formed by elongating the bottom-side end of the first ball groove 51. As such, the third ball groove 53 is recessed relative to the first ball groove 51. Specifically, the third ball groove 53 is shaped such that a locus T3 of the center of the ball 30 rolling in the third ball groove 53 forms a circular arc with a center of curvature at a point O3 that is located further away from the third ball groove 53 than the point O1. Further, like the second ball groove 52, the third ball groove 53 has a surface that is subjected to plastic working and that is not subjected to grinding.

Next, the structure of the second ball groove 52 is described in detail with reference to FIG. 4 and FIG. 5. As illustrated in FIG. 5, a ball groove radius Ra2 of the second ball groove 52 is larger than a ball groove radius Ra1 of the first ball groove 51 over the entire length of the second ball groove 52. The "ball groove radius" refers to a radius of an imaginary inscribed circle of a ball groove. The ball groove radius Ra1 of the first ball groove 51 is slightly larger than the radius of the ball 30. The ball groove radius Ra2 of the second ball groove 52 is larger than the radius of the ball 30 and is larger than the ball groove radius Ra1 of the first ball groove 51. As such, an opening-side end of the second ball groove 52 has a circular arc shape that follows the shape of the opening-side end of the first ball groove 51.

Figure 4:
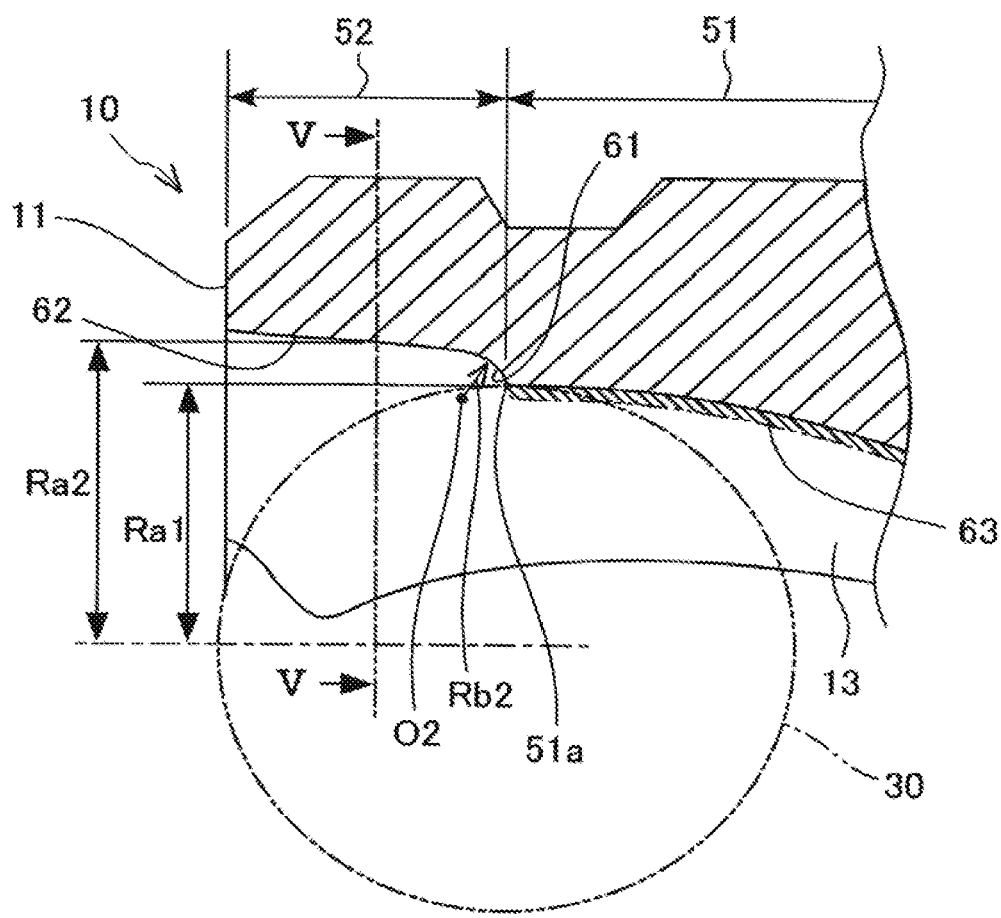
FIG. 4 is an enlarged partial cross-sectional view illustrating a second ball groove of the outer ball groove and an outline of a first ball groove before the first ball groove is subjected to grinding.
Figure 5:
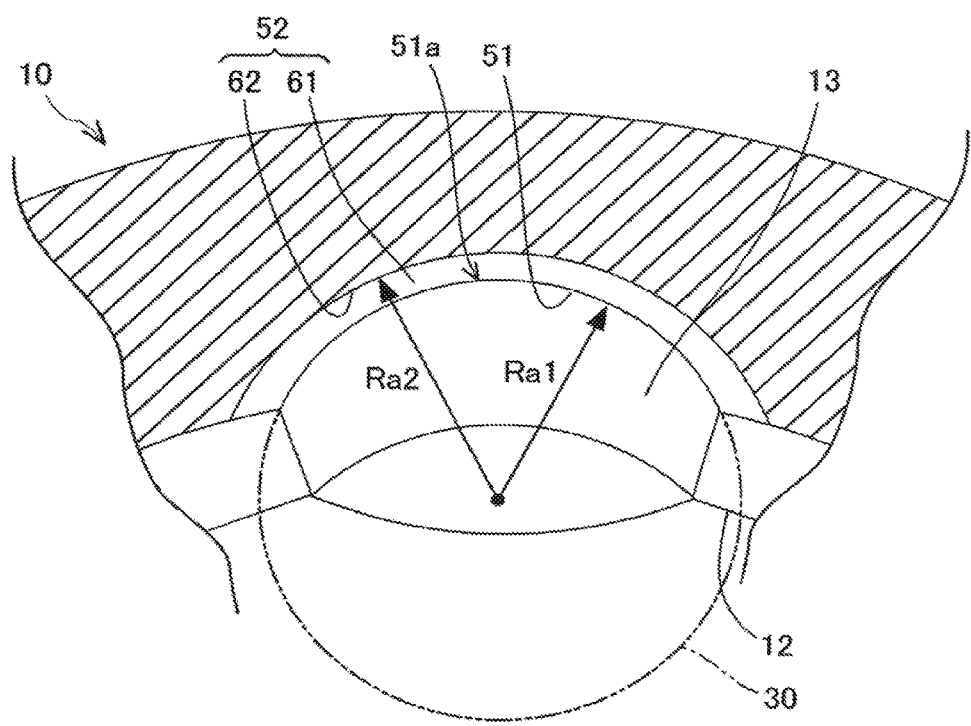
FIG. 5 is a cross-sectional view taken along line V-V in FIG. 4.

As illustrated in FIG. 4, the second ball groove 52 has a curved line 61 and a connecting line 62 in an axial cross section passing through the bottom of the outer ball groove 13. The curved line 61 is curved from a groove bottom end 51a of the first ball groove 51 in a concave manner in a radially outward direction of the outer joint member 10. The groove bottom end 51a is an end of the bottom of the first ball groove 51 that is located closer to the opening 11 than to the bottom of the outer joint member 10.

The curved line 61 is shaped to follow a circular arc that has a curvature center O2 at one point and that has a curvature radius Rb2. The curvature center O2 is located closer to the opening 11 than the groove bottom end 51a of the first ball groove 51 and is also located radially inside the outer joint member 10. Thus, according to the present embodiment, the curved line 61 is shaped to follow a single circular arc with the curvature center O2. Alternatively, the curvature center O2 can be variable so that the curved line 61 can be shaped to follow a shape different from a single circular arc. For example, the curved line 61 may be shaped to follow an ellipse. Also in this alternative, the curvature center O2 satisfies the above-described conditions.

The curvature radius Rb2 that is a distance from the curvature center O2 to the curved line 61 is smaller than a distance Rc1 (refer to FIG. 3) from the rotation axis L1 of the outer joint member 10 to the groove bottom end 51a of the first ball groove 51. As such, the second ball groove 52 is sharply concaved in the radially outward direction from the opening-side end of the first ball groove 51.

The connecting line 62 connects an opening-side end of the curved line 61 and the opening 11. A distance Rc2 (refer to FIG. 3) from the connecting line 62 to the rotation axis L1 of the outer joint member 10 increases in a direction from the bottom of the outer joint member 10 to the opening 11 of the outer joint member 10. In an area of the second ball groove 52 where the connecting line 62 is located, the ball groove radius Ra2 gradually increases in the direction from the bottom of the outer joint member 10 to the opening 11 of the outer joint member 10.

Next, a method of manufacturing the outer joint member 10 is described with reference to FIG. 4. The outer joint member 10 is formed by grinding the first ball groove 51 after plastic working. The plastic working process includes forging and ironing subsequent to the forging process. Thus, the plastic working process forms a rough shape of the first ball groove 51, and then the grinding process grinds the rough shape so that the first ball groove 51 has a ground surface. In contrast, each of the second ball groove 52 and third ball groove 53 is not subjected to grinding and thus has an unground, plastically worked surface.

In FIG. 4, a long dashed double-short dashed line represents a surface of the first ball groove 51 before the first ball groove 51 is subjected to grinding, i.e., represents a surface of the first ball groove 51 formed by plastic working. A machining allowance 63 is removed by grinding.

The second ball groove 52 adjoins to the opening-side end of the first ball groove 51. As illustrated in FIG. 4, according to the present embodiment, the curved line 61 of the second ball groove 52 is curved with the curvature center O2 that is located closer to the opening 11 than the groove bottom end 51a and that is located radially inside the outer joint member 10. Specifically, the curved line 61 is curved from the groove bottom end 51a in a concave manner in the radially outward direction of the outer joint member 10.

This feature makes it possible to grind the first ball groove 51 according to the present embodiment with a grinding wheel, without the grinding wheel touching the area of the second ball groove 52 where the curved line 61 is located. In addition, the connecting line 62 expands radially outward further from the curved line 61. Thus, the machining allowance 63 substantially covers an area corresponding to the first ball groove 51. Since the time spent to grind part of the second ball groove 52 is unnecessary, machining lead time is reduced accordingly.

Next, an outer joint member 110 according to a second embodiment is described with reference to FIG. 6. Elements of the outer joint member 110 similar to those of the outer joint member 10 according to the first embodiment are denoted by the same numerals as in the first embodiment, and their description is omitted as appropriate.

Figure 6:
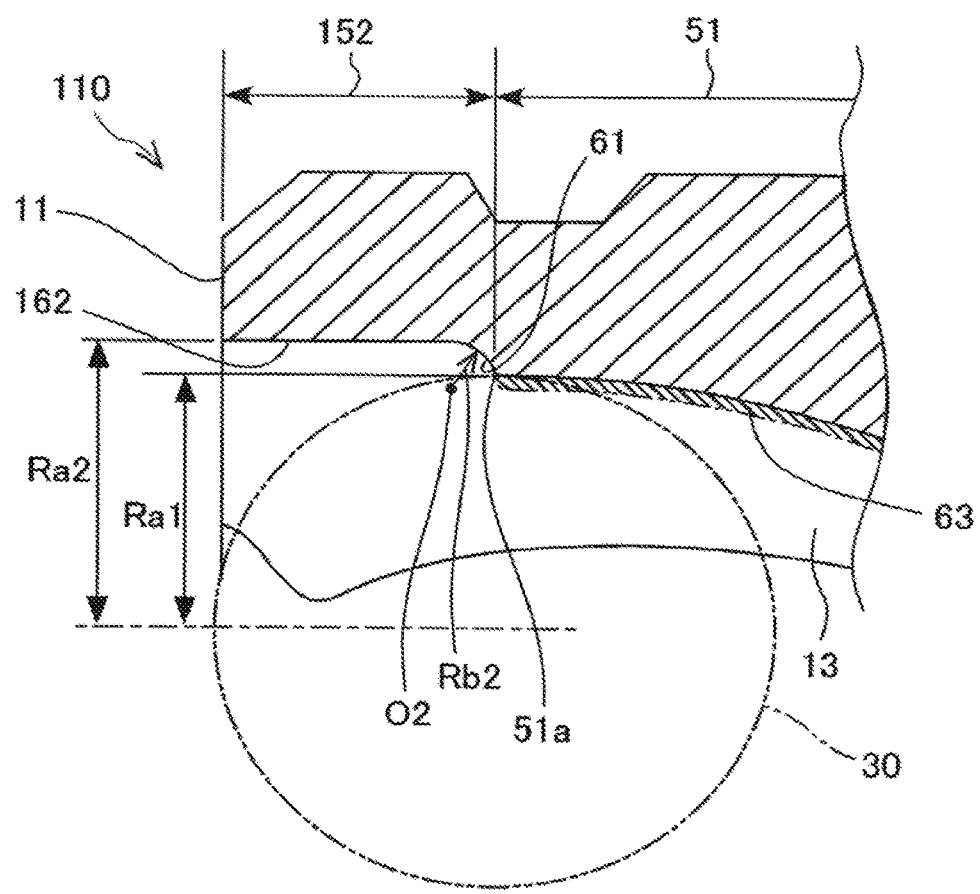
FIG. 6 illustrates a second embodiment and is an enlarged partial cross-sectional view illustrating a second ball groove of an outer ball groove and an outline of a first ball groove before the first ball groove is subjected to grinding.

As illustrated in FIG. 6, a second ball groove 152 of the outer joint member 110 has a curved line 61 and a connecting line 162 in an axial cross section passing through the bottom of an outer ball groove 13. The curved line 61 of the second ball groove 152 is the same as the curved line 61 of the second ball groove 52 according to the first embodiment. The connecting line 162 connects the curved line 61 and the opening 11. The connecting line 162 is parallel to a rotation axis L1 (refer to FIG. 1 and FIG. 3) of the outer joint member 110 in a direction from the bottom of the outer joint member 110 to an opening 11 of the outer joint member 110. In an area of the second ball groove 152 where the connecting line 162 is located, a ball groove radius Ra2 of the second ball groove 152 is constant. Thus, like in the first embodiment, a machining allowance 63 substantially covers an area corresponding to the first ball groove 51. Since the time spent to grind part of the second ball groove 152 is unnecessary, machining lead time is reduced accordingly.

Figure 7:
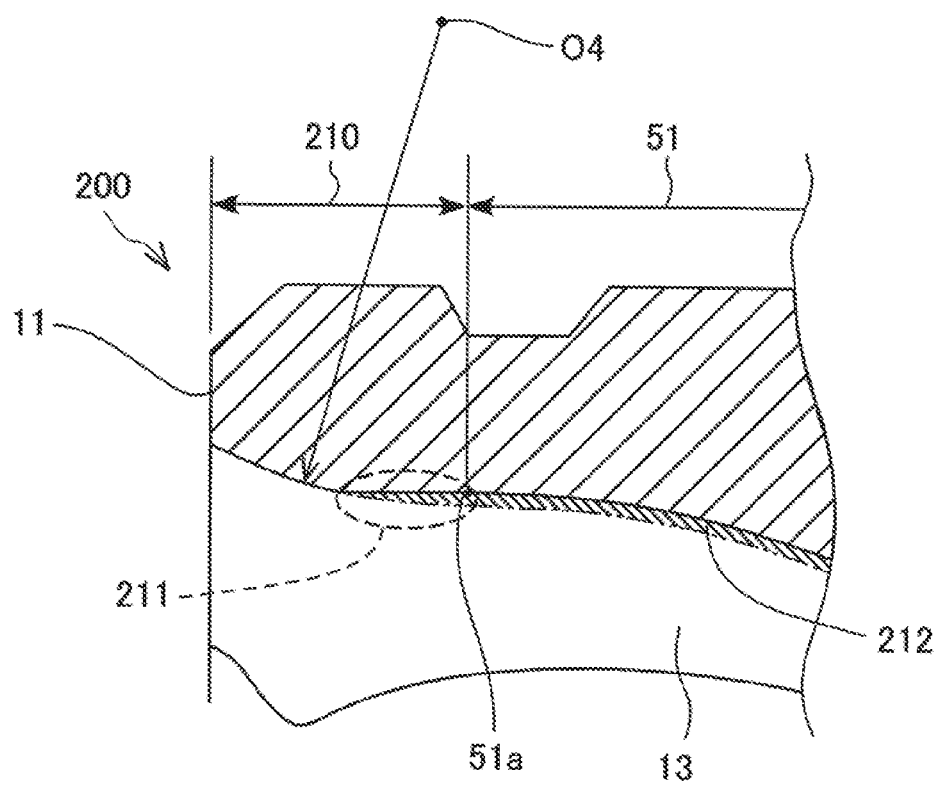
FIG. 7 illustrates a conventional structure and is an enlarged partial cross-sectional view illustrating a second ball groove of an outer ball groove and an outline of a first ball groove before the first ball groove is subjected to grinding.

For comparison purpose, a constant velocity joint 200 having a conventional structure is described with reference to FIG. 7. FIG. 7 corresponds to FIG. 4 of the first embodiment and illustrates a conventional first ball groove 51 and a conventional second ball groove 210. In the description below, elements of the constant velocity joint 200 similar to those described in the embodiments are denoted by the same numerals as in the embodiments, and their description is omitted as appropriate.

As illustrated in FIG. 7, the bottom of the conventional second ball groove 210 that is not subjected to grinding is shaped to follow a convex circular arc with a center of curvature at a point O4 that is located radially outside the outer joint member 10. Thus, the bottom of the second ball groove 210 expands in a radially inward direction of the outer joint member 10. In this case, when grinding the bottom of the first ball groove 51, a grinding wheel may touch part (region 211 in FIG. 7) of the second ball groove 210 in the vicinity of an opening-side end of the first ball groove 51 (rolling area), thus grinding the second ball groove 210.

Accordingly, as indicated by diagonal lines in FIG. 7, a machining allowance 212 necessary for grinding covers part of the second ball groove 210 that is located closer to the opening 11 than the groove bottom end 51a of the first ball groove 51. The time spent to grind the part of the second ball groove 210 that does not need grinding may elongate grinding lead time.

As described above, according to the first and second embodiments, a constant velocity joint 100 includes: a bottomed cylindrical outer joint member 10, 110 having an opening 11 at one side in the direction of a rotation axis L1 and having a concave spherical inner circumferential surface 12 provided with multiple outer ball grooves 13; an inner joint member 20 located inside the outer joint member 10, 110 and having a convex spherical outer circumferential surface 21 provided with multiple inner ball grooves 22; multiple balls 30 that roll in the outer ball grooves 13 and the inner ball grooves 22; and a cage 40 located between the inner circumferential surface 12 of the outer joint member 10, 110 and the outer circumferential surface 21 of the inner joint member 20 to accommodate the balls 30.

Each of the outer ball grooves 13 of the outer joint member 10, 110 includes a first ball groove 51 and a second ball groove 52, 152. The first ball groove 51 allows a corresponding one of the balls 30 to roll therein when the constant velocity joint 100 operates. The second ball groove 52, 152 is located closer to the opening 11 than the first ball groove 51 and has a ball groove radius Ra2 larger than a ball groove radius Ra1 of the first ball groove 51. The second ball groove 52, 152 has a curved line 61 and a connecting line 62, 162 in an axial cross section passing through the bottom of a corresponding one of the outer ball grooves 13. The curved line 61 is connected to a groove bottom end 51a of the first ball groove 51 and is curved radially outward in a concave manner. The groove bottom end 51a is an end of the bottom of the first ball groove 51 that is located closer to the opening 11 than to the bottom of the outer joint member 10, 110. The connecting line 62, 162 connects the curved line 61 and the opening 11. The curved line 61 is curved with a curvature center O2 that is located closer to the opening 11 than the groove bottom end 51a of the first ball groove 51 and that is located radially inside the outer joint member 10, 110.

The first ball groove 51 is used when the constant velocity joint 100 operates. Therefore, the first ball groove 51 is subjected to grinding. The second ball groove 52, 152 is located closer to the opening 11 than the first ball groove 51 and is used when the constant velocity joint 100 is assembled, not when the constant velocity joint 100 operates. Therefore, the second ball groove 52, 152 does not need grinding.

Thus, in the outer joint member 10, 110 of the constant velocity joint 100 according to the first and second embodiments, the first ball groove 51 has a surface subjected to grinding while the second ball groove 52, 152 has a surface subjected to plastic working.

The ball groove radius Ra2 of the second ball groove 52, 152 is larger than the ball groove radius Ra1 of the first ball groove 51. The bottom of the second ball groove 52, 152 has the curved line 61 and the connecting line 62, 162. The curved line 61 is curved with the curvature center O2 that is located closer to the opening 11 than the groove bottom end 51a as a junction with the first ball groove 51 and that is located radially inside the outer joint member 10, 110. Specifically, the curved line 61 is curved from the groove bottom end 51a in a concave manner in the radially outward direction of the outer joint member 10, 110.

This feature makes it possible to grind the first ball groove 51 without a grinding tool, such a grinding wheel, touching an area of the second ball groove 52, 152 where the curved line 61 is located. Since the second ball groove 52, 152 is not grinded when grinding the first ball groove 51, machining lead time is reduced accordingly. This also reduces the area of the outer ball groove 13 subjected to grinding, thus reducing the amount of machining. Accordingly, a member, such as a grinding wheel, used in grinding is less likely to wear out. Thus, the constant velocity joint 100 according to the present embodiments allows a reduction in manufacturing cost.

Further, in the constant velocity joint 100 according to the first and second embodiments, in an axial cross section passing through the bottom of the outer ball groove 13, a curvature radius Rb2 (refer to FIG. 4 and FIG. 6) that is a distance from the curvature center O2 to the curved line 61 is smaller than a distance Rc1 (refer to FIG. 3) from the rotation axis L1 of the outer joint member 10, 110 to the groove bottom end 51a. As such, the second ball groove 52, 152 is sharply concaved in the radially outward direction from the end of the first ball groove 51 that is located closer to the opening 11 than to the bottom of the outer joint member 10, 110. This feature makes it possible to grind the outer ball groove 13 reliably without a grinding tool, such as a grinding wheel, touching the curved line 61, thus reducing machining lead time and manufacturing cost.

Further, in the constant velocity joint 100 according to the first and second embodiments, the curved line 61 is shaped to follow a single circular arc with the curvature center O2. The shape of the curved line 61 that follows a single circular arc facilitates a machining process, such as forging, for forming the curved line 61 on the outer joint member 10, 110, thus reliably reducing manufacturing cost. Further, the shape of the curved line 61 facilitates designing a forging die. Instead of a single circular arc, the curved line 61 may be shaped to follow a combination of circular arcs, such as an ellipse.

In the outer joint member 10 of the constant velocity joint 100 according to the first embodiment, a distance Rc2 (refer to FIG. 3) from the connecting line 62 to the rotation axis L1 of the outer joint member 10 increases in the direction from the bottom of the outer joint member 10 to the opening 11 of the outer joint member 10. Further, in the area of the second ball groove 52 where the connecting line 62 is located, the ball groove radius Ra2 (refer to FIG. 4) gradually increases in the direction from the bottom of the outer joint member 10 to the opening 11 of the outer joint member 10. This feature makes it possible to grind the outer ball groove 13 reliably without a grinding tool, such as a grinding wheel, touching the area of the second ball groove 52 where the connecting line 62 is located, thus reducing machining lead time and manufacturing cost.

In the outer joint member 110 of the constant velocity joint 100 according to the second embodiment, the connecting line 162 is parallel to the rotation axis L1 (refer to FIG. 1 and FIG. 3) of the outer joint member 110 in the direction from the bottom of the outer joint member 110 to the opening 11 of the outer joint member 110. Further, in the area of the second ball groove 152 where the connecting line 162 is located, the ball groove radius Ra2 (refer to FIG. 6) is constant. This feature also makes it possible to grind the outer ball groove 13 reliably without a grinding tool, such as a grinding wheel, touching the connecting line 162, thus reducing machining lead time and manufacturing cost.

What is claimed is:

1. A constant velocity joint comprising:
    a bottomed cylindrical outer joint member having an opening at one side in an axial direction and having a concave spherical inner circumferential surface provided with a plurality of outer ball grooves;
    an inner joint member located inside the outer joint member and having a convex spherical outer circumferential surface provided with a plurality of inner ball grooves;
    a plurality of balls that roll in the plurality of outer ball grooves and the plurality of inner ball grooves; and
    a cage located between the inner circumferential surface of the outer joint member and the outer circumferential surface of the inner joint member to accommodate the plurality of balls, wherein
    each of the plurality of outer ball grooves includes a first ball groove and a second ball groove, the first ball groove allowing a corresponding one of the plurality of balls to roll therein when the constant velocity joint operates, the second ball groove located closer to the opening than the first ball groove and having a ball groove radius larger than a ball groove radius of the first ball groove,
    the second ball groove has a curved line and a connecting line in an axial cross section passing through a bottom of a corresponding one of the plurality of outer ball grooves, the curved line connected to a groove bottom end of the first ball groove and curved radially outward in a concave manner, the groove bottom end being an end of a bottom of the first ball groove located closer to the opening than to a bottom of the outer joint member, the connecting line connecting the curved line and the opening, and
    the curved line is curved with a center of curvature that is located closer to the opening than the groove bottom end of the first ball groove and that is located radially inside the outer joint member.

2. The constant velocity joint according to claim 1, wherein
    in the axial cross section passing through the bottom of the corresponding one of the plurality of outer ball grooves, a distance from the center of curvature to the curved line is smaller than a distance from a rotation axis of the outer joint member to the groove bottom end.

3. The constant velocity joint according to claim 1, wherein
    the curved line is shaped to follow a single circular arc with the center of curvature.

4. The constant velocity joint according to claim 1, wherein
    a distance from the connecting line to a rotation axis of the outer joint member increases in a direction from the bottom of the outer joint member to the opening of the outer joint member, and
    in an area of the second ball groove where the connecting line is located, the ball groove radius of the second ball groove gradually increases in the direction from the bottom of the outer joint member to the opening of the outer joint member.

5. The constant velocity joint according to claim 1, wherein
    the connecting line is parallel to a rotation axis of the outer joint member in a direction from the bottom of the outer joint member to the opening of the outer joint member, and
    in an area of the second ball groove where the connecting line is located, the ball groove radius of the second ball groove is constant.

6. The constant velocity joint according to claim 1, wherein
    the first ball groove has a ground surface, and
    the second ball groove has a plastically worked surface.

7. A method of manufacturing the constant velocity joint according to claim 1, the method comprising:
    forming the first ball groove by grinding; and
    forming the second ball groove by plastic working.

* * * * *